W. H. TRUESDELL.
Churn.
No. 18,936.
Patented Dec. 22, 1857.
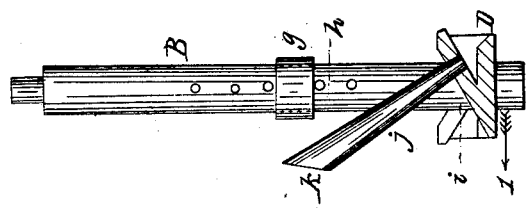
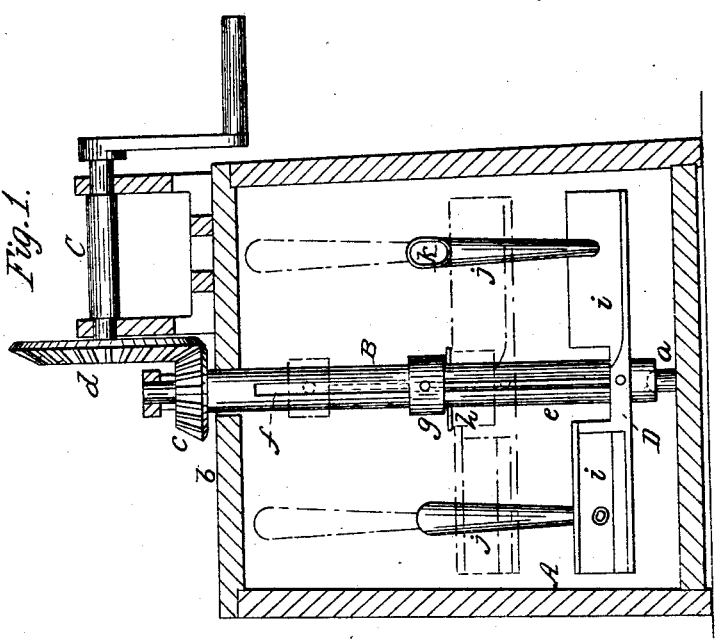

UNITED STATES PATENT OFFICE.

WILLIAM H. TRUESDELL, OF ELGIN, ILLINOIS.

CHURN.

Specification of Letters Patent No. 18,936, dated December 22, 1857.

*To all whom it may concern:*

Be it known that I, WILLIAM H. TRUESDELL, of Elgin, in the county of Kane and State of Illinois, have invented a new and useful Improvement in Churns; and I do hereby declare that the following is a full, clear, and exact description of the same, reference being had to the annexed drawings, making a part of this specification, in which—

Figure 1 is a vertical central section of my improvement. Fig. 2 is a detached vertical section of the dasher taken in the line (*x*) (*x*) Fig. 1.

Similar letters of reference indicate corresponding parts in the two figures.

This invention relates to an improvement in that class of churns in which a horizontal rotating dasher is employed for agitating the cream.

The object of the invention is to facilitate, after the churning, the collecting of the small particles of butter into a mass an operation not readily performed with the class of churns above referred to. The desired result is attained by the employment of a dasher of peculiar formation, so arranged that it may slide upon its staff and be, after the churning is performed, secured at any desired point corresponding with the surface of the cream so that the particles of butter, by the gentle turning of the dasher, will be readily collected or gathered into a single mass.

To enable those skilled in the art to fully understand and construct my invention I will proceed to describe it.

A represents the case or box of the churn which may be of any desired form although the cylindrical, polygonal or approximate forms would probably be preferable.

B represents a vertical shaft the lower end of which is stepped at the center of the bottom (*a*) of the case or box A, said shaft extending upward through the center of the top or cover (*b*) of the case or box and having a bevel pinion (*c*) on it, which pinion gears into a wheel (*d*) on the inner end of a horizontal shaft C, which is fitted in proper bearings on the top or cover (*b*). The top or cover (*b*) is formed as usual of two parts so that it can be readily removed when desired either one or both parts.

On the shaft B a traverse bar D is placed said bar being allowed to slide freely up and down on the shaft and prevented from turning thereon by means of rods (*e*) the lower ends of which are attached to the bar D and are fitted in grooves (*f*) the upper ends of the rods being attached to a collar or band (*g*) which is also placed loosely on the shaft and secured at any desired point by a pin (*h*) or other suitable device. Each end of the bar D has an inclined board (*i*) attached to it and through each board the lower end of a tube (*j*) passes, said tubes being slightly inclined and in such a position that their upper orifices (*k*) will receive the air forced into them by the rotation of the bar D and shaft B, see Fig. 2, in which arrow (*l*) shows the direction of the movement of the bar and shaft.

The bar D with its inclined boards (*i*) (*i*) forms the dasher and agitates the milk by its rotation, the motion being imparted to it from the shaft C by means of the gearing (*c*) (*d*). The tubes (*j*) (*j*) serve to introduce air into the mass of cream thereby expediting its formation or production. After the butter is produced, the bar D is raised to the surface, or nearly to the surface, of the cream and is supported in proper position by the pin (*h*) which is inserted in the shaft B below the collar (*g*). By turning the shaft B, gently in a reverse direction the butter will be collected, the inclined boards (*i*) forming chambers to receive it. It will be understood that the butter being specifically lighter than the cream or milk, floats on its surface, in small particles as it is formed or produced, and as it is essential that the dasher when in operation should be near the bottom of the case or box in order to operate in the most effectual manner on the cream, the dasher after the butter is produced must be elevated in order to collect or gather the butter at the surface of the cream milk or else the dasher must be removed altogether or taken out of the churn and a separate device introduced in order to collect or gather it. The latter plan is pursued in the churns of this class hitherto constructed. No provision has been made so far as I am aware, for obviating the difficulty attending the gathering or collecting of the butter. By my improvement this difficulty is obviated in a very simple and practicable way.

I do not claim the introduction of atmospheric air into the body or mass of cream while being agitated or churned in order to expedite the formation of butter for this has been previously done and in various ways; nor do I claim, broadly, the idea of adjusting the dashers in churns. But

Having thus described my invention, what I claim and desire to secure by Letters-Patent, is—

The employment of the peculiarly-formed dashers D, having air-tubes (*j*) attached; said dashers being so made as to churn and introduce the air when turned in one direction, and presenting chambers for the collection of the butter when the direction is reversed.

WILLIAM H. TRUESDELL.

Witnesses:
   B. BURRITT,
   HENRY SHERMAN.